(12) United States Patent
Haag et al.

(10) Patent No.: US 9,080,553 B2
(45) Date of Patent: Jul. 14, 2015

(54) METHOD AND APPARATUS FOR CONTROL OF REDUNDANT DEVICES IN A WIND TURBINE

(75) Inventors: Christian Haag, Karlstad (SE); Joseph Law, Greer, SC (US); Till Hoffmann, Osnabrueck (DE)

(73) Assignee: General Electric Company, Schenectady, NY (US)

( * ) Notice: Subject to any disclaimer, the term of this patent is extended or adjusted under 35 U.S.C. 154(b) by 750 days.

(21) Appl. No.: 13/354,703

(22) Filed: Jan. 20, 2012

(65) Prior Publication Data
US 2013/0187382 A1    Jul. 25, 2013

(51) Int. Cl.
*F03D 7/02* (2006.01)
*F03D 9/00* (2006.01)
*H02P 101/15* (2015.01)

(52) U.S. Cl.
CPC ...... *F03D 9/003* (2013.01); *F03D 7/02* (2013.01); *F05B 2260/845* (2013.01); *H02P 2101/15* (2015.01); *Y02E 10/723* (2013.01)

(58) Field of Classification Search
CPC .................................. F03D 1/003; F03D 7/02
USPC ....................................................... 416/33, 34
See application file for complete search history.

(56) References Cited

U.S. PATENT DOCUMENTS

| | | |
|---|---|---|
| 2006/0214428 A1* | 9/2006 | Altemark et al. ............... 290/44 |
| 2009/0187283 A1* | 7/2009 | Laursen et al. ................ 700/287 |
| 2010/0138267 A1* | 6/2010 | Vittal et al. ....................... 705/8 |
| 2010/0143126 A1* | 6/2010 | Wan ................................ 416/61 |
| 2014/0152013 A1* | 6/2014 | Spruce ............................ 290/44 |

\* cited by examiner

*Primary Examiner* — Richard Edgar
(74) *Attorney, Agent, or Firm* — Global Patent Operation; Douglas D. Zhang

(57) ABSTRACT

A method and apparatus for control of redundant devices in a wind turbine is provided, comprising operating a first redundant device and at least one other redundant device such that the first redundant device is expected to fail before any of the at least one other redundant devices.

15 Claims, 8 Drawing Sheets

METHOD AND APPARATUS FOR CONTROL OF REDUNDANT DEVICES IN A WIND TURBINE

BACKGROUND OF THE INVENTION

The subject matter described herein relates generally to methods and systems for controlling redundant devices in a wind turbine.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in Conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

Wind turbines are sometimes equipped with redundant devices that enable continuing operation of the wind turbine when at least one of the redundant devices either enters a resting state or fails. For example two fans may be installed redundantly so that if one fails, the wind turbine can continue operating, although possibly at reduced performance.

BRIEF DESCRIPTION OF THE INVENTION

According to one aspect, a method of operating redundant devices in a wind turbine is provided, comprising operating a first device and at least one other further device redundant to the first device, and subjecting the first device, over a time of wind turbine operation, to a greater lifetime reduction compared to any of the at least one further devices.

According to another aspect, a method of operating redundant devices in a wind turbine is provided, comprising operating a first redundant device and at least one other redundant device such that the first redundant device is expected to fail before any of the at least one other redundant device; alternately imposing at least two states on the first redundant device; wherein, the at least two states comprise at least one lifetime reducing state; and, wherein, over a time of wind turbine operation, the first redundant device is subjected to a greater lifetime reduction compared to any of the at least one other redundant devices.

In yet another aspect, a wind turbine is provided comprising a tower supporting a nacelle, at least one blade for receiving energy, a first redundant device, and at least one other redundant device, wherein the first redundant device is operated such that the first redundant device is expected to fail before each of the at least one other redundant devices.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
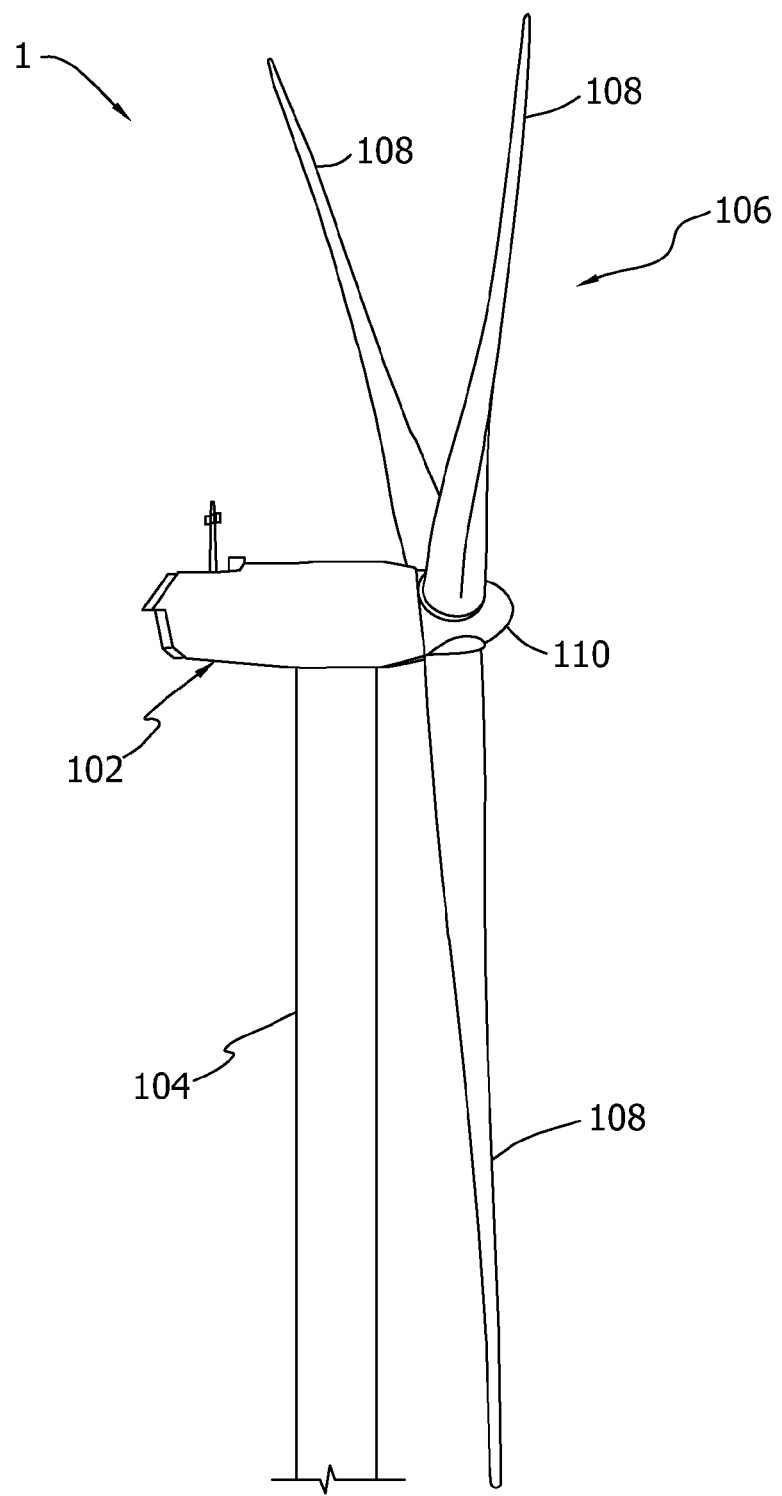
FIG. 1 is a perspective view of a portion of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that the repair or replacement of a redundant device can be done at a regularly scheduled maintenance visit, rather than a specially scheduled or emergency maintenance visit, thus saving operational costs.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

As used herein, the term "resting state" is an operational state of a device, for example a redundant device, which has the effect of not using or minimally using or using comparatively less of the expected available lifetime of operability of the redundant device, especially in comparison to other states. For example, the resting state may have no impact on the remaining expected lifetime of the redundant device. For example, the resting state may be an off state, or a state that results in less wear of components of the redundant device in comparison to the wear of the components of the redundant device when the device is operated at other states or levels; other states in this context refer to for example the state of being on, which may comprise various levels of operation, for example fully on, operating at a high level (of a lifetime reducing state), a medium level (of a lifetime reducing state), or a low level (of a lifetime reducing state). A "lifetime reducing state" as used herein is for example a condition of being on (as opposed to off), or a condition which results in more wear or reduction of lifetime in comparison to a resting state. A lifetime reducing state may comprise multiple levels of operation, which may be discrete or continuous levels; for example a high lifetime reducing level of a lifetime reducing state may be a fan operating at a maximum speed, a medium lifetime reducing level of a lifetime reducing state may be a fan operating at a medium speed, and a low lifetime reducing level of a lifetime reducing state may be a fan operating at a low speed. A resting state of a redundant device is not intended to be limited to a state of the redundant device being off, rather to a state of having less impact, in comparison to a lifetime reducing state, on the wear, the rate of wear, the decrease of the remaining expected lifetime, or the rate of decrease of the remaining expected lifetime of the redundant device.

As used herein, the terms "first control" and "second control" are intended to be representative of means of setting or controlling the state (e.g. such that the state may include at least one of power output [e.g. a state of operating at 10 watts], power consumption, rate of motion, and the like) of a first redundant device and at least one other redundant device (for example a second redundant device), respectively. As used herein, the term "redundant device" is intended to be representative of a component, device, equipment, piece of equipment, or the like that is similar (e.g. similar at least partially in function) or identical to at least one other redundant device. For example two fans can be redundant devices. Examples of different types of redundant devices are: a temperature controlling device, a temperature adjusting device, a heater, a pump, a fan, a cooling fan, and a switch. Herein, "to alternately impose" is intended to be representative of temporally changing a state or condition of a thing (such as a redundant device) so that the thing is temporarily in one state, then temporarily in another state, and is temporarily in yet another state, and so on, to temporarily impose succeeding states (a succeeding state may be identical or substantially similar to a previous state), possibly until the thing fails; a state may be a sub-state or level of a state (e.g. a high, medium, and low level or setting of an on state). Herein, the phrase "[a thing] is expected to fail before [another thing]" (wherein "a thing" and "another thing" are, to name a few examples: a pair of redundant devices, a first redundant device and at least one other redundant device, a pair of fans, a pair of fans of the same design, identical fans, or even non-identical fans) is intended to be representative of a probabilistically determinable outcome, based on for example product specifications of the things, engineering test results of durability or robustness of the things, failure rates of the things, or assumptions such as that longer running times or more severe running conditions (e.g. operating at higher levels) or more frequent switching of the things decrease their lifetimes, e.g. their remaining lifetimes.

FIG. 1 is a perspective view of a portion of an exemplary wind turbine 1. Wind turbine 1 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 1 as described herein. Wind turbine 1 also includes a rotor 106 that includes three blades 108 attached to a rotating hub 110. Alternatively, wind turbine 1 includes any number of blades 108 that facilitates operation of wind turbine 1 as described herein. In the exemplary embodiment, wind turbine 1 includes a gearbox (not shown in FIG. 1) operatively coupled to rotor 106 and a generator (not shown in FIG. 1).

Figure 2:
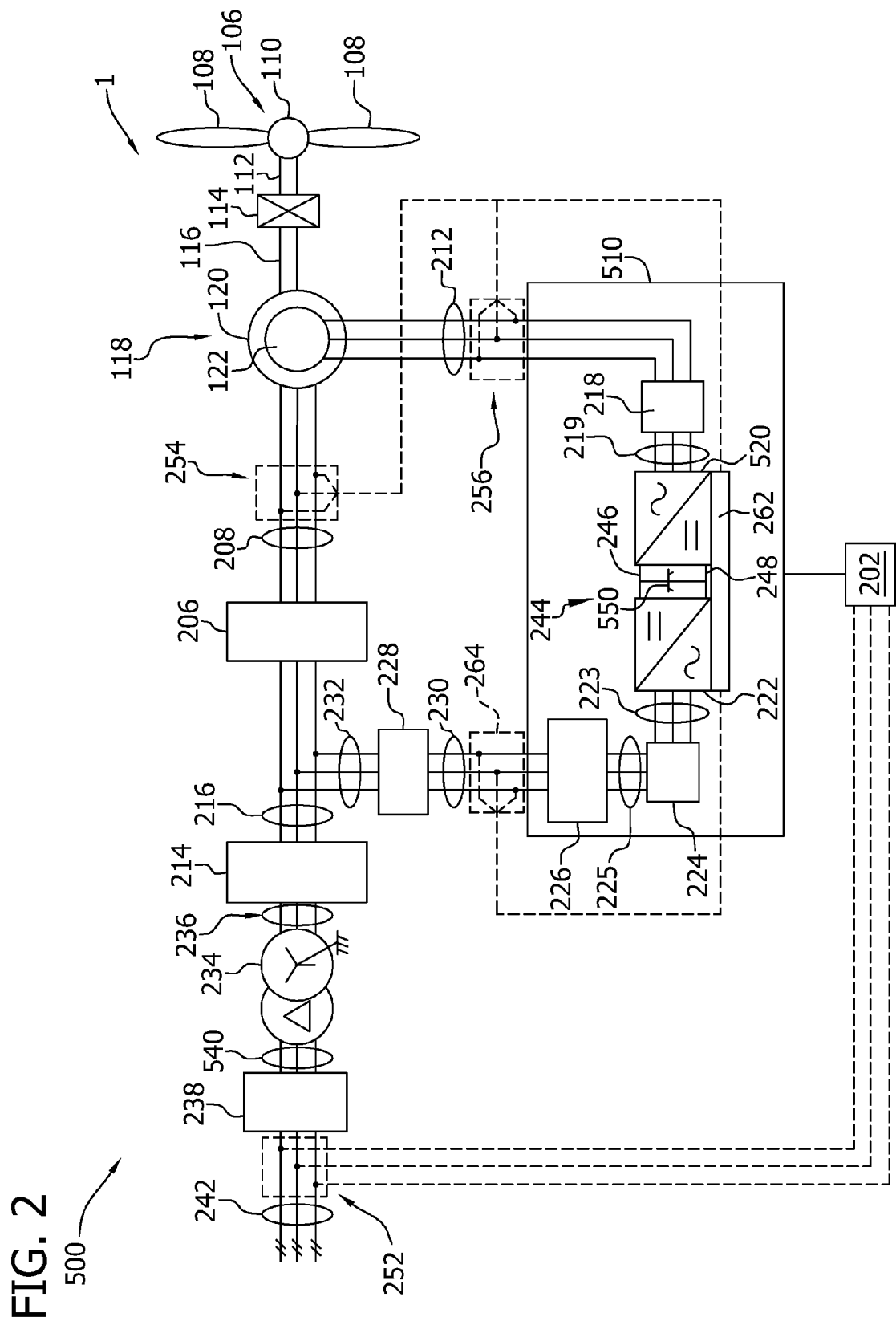
FIG. 2 is a schematic view of an exemplary electrical and control system suitable for use with the wind turbine shown in FIG. 1.

FIG. 2 is a schematic view of an exemplary electrical and control system 500 that may be used with wind turbine 1. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shall 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 1 as described herein. As a further alternative, wind turbine 1 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 500 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 510 via a rotor bus 212. Alternatively, generator rotor 122 is electrically coupled to rotor bus 212 via any other device that facilitates operation of electrical and control system 500 as described herein. As a further alternative, electrical and control system 500 is configured as a full power conversion system (not shown) that includes a full power conversion assembly (not shown in FIG. 2) similar in design and operation to power conversion assembly 510 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 510. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 510 includes a rotor filter 218 that is electrically coupled to generator rotor 122 via rotor bus 212. A rotor filter bus 219 electrically couples rotor filter 218 to a rotor-side power converter 520, and rotor-side power converter 520 is electrically coupled to a line-side power converter 222. Rotor-side power converter 520 and line-side power converter 222 are power converter bridges including power semiconductors (not shown). In the exemplary embodiment, rotor-side power converter 520 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 520 and line-side power converter 222 have any configuration using any switching devices that facilitate operation of electrical and control system 500 as described herein. Power conversion assembly 510 is coupled in electronic data communication with turbine controller 202 to control the operation of rotor-side power converter 520 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 500. Main transformer circuit breaker 214 is electrically coupled to an electric power main transformer 234 via a generator-side bus 236. Main transformer 234 is electrically coupled to a grid circuit breaker 238 via a breaker-side bus 540. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 540. In another embodiment, neither fuses nor grid circuit breaker 238 is used, but rather main transformer 234 is coupled to the electric power transmission and distribution grid via breaker-side bus 540 and grid bus 242.

In the exemplary embodiment, rotor-side power converter 520 is coupled in electrical communication with line-side power converter 222 via a single direct current (DC) link 244. Alternatively, rotor-side power converter 520 and line-side power converter 222 are electrically coupled via individual and separate DC links (not shown in FIG. 2). DC link 244 includes a positive rail 246, a negative rail 248, and at least one capacitor 550 coupled between positive rail 246 and negative rail 248. Alternatively, capacitor 550 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 1. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 500 that facilitates operation of electrical and control system 500 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 500 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 510. Alternatively, converter controller 262 has any configuration that facilitates operation of electrical and control system 500 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 540, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 510 via rotor bus 212. Within power conversion assembly 510, the electrical power is transmitted to rotor filter 218 and the electrical power is modified for the rate of change of the PWM signals associated with rotor-side power converter 520. Rotor-side power converter 520 acts as a rectifier and rectifies the sinusoidal, three-phase AC power to DC power. The DC power is transmitted into DC link 244. Capacitor 550 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 510.

Conversion circuit breaker 228, main transformer circuit breaker 214, and grid circuit breaker 238 are configured to disconnect corresponding buses, for example, when excessive current flow may damage the components of electrical and control system 500. Additional protection components are also provided including line contactor 226, which may be controlled to form a disconnect by opening a switch (not shown in FIG. 2) corresponding to each line of line bus 225.

Power conversion assembly 510 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 510, and specifically, the bi-directional characteristics of rotor-side power converter 520 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 510. Within power conversion assembly 510, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 550 facilitates mitigating DC link 244 voltage amplitude variations by facilitating mitigation of a DC ripple sometimes associated with three-phase AC rectification.

The DC power is subsequently transmitted from DC link 244 to rotor-side power converter 520 and rotor-side power converter 520 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 520 to rotor filter 218 via rotor filter bus 219 and is subsequently transmitted to generator rotor 122 via rotor bus 212, thereby facilitating sub-synchronous operation.

Power conversion assembly 510 is configured to receive control signals from turbine controller 202. The control signals are based on sensed conditions or operating characteristics of wind turbine 1 and electrical and control system 500. The control signals are received by turbine controller 202 and used to control operation of power conversion assembly 510. Feedback from one or more sensors may be used by electrical and control system 500 to control power conversion assembly 510 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 510 to approximately zero.

Figure 3:
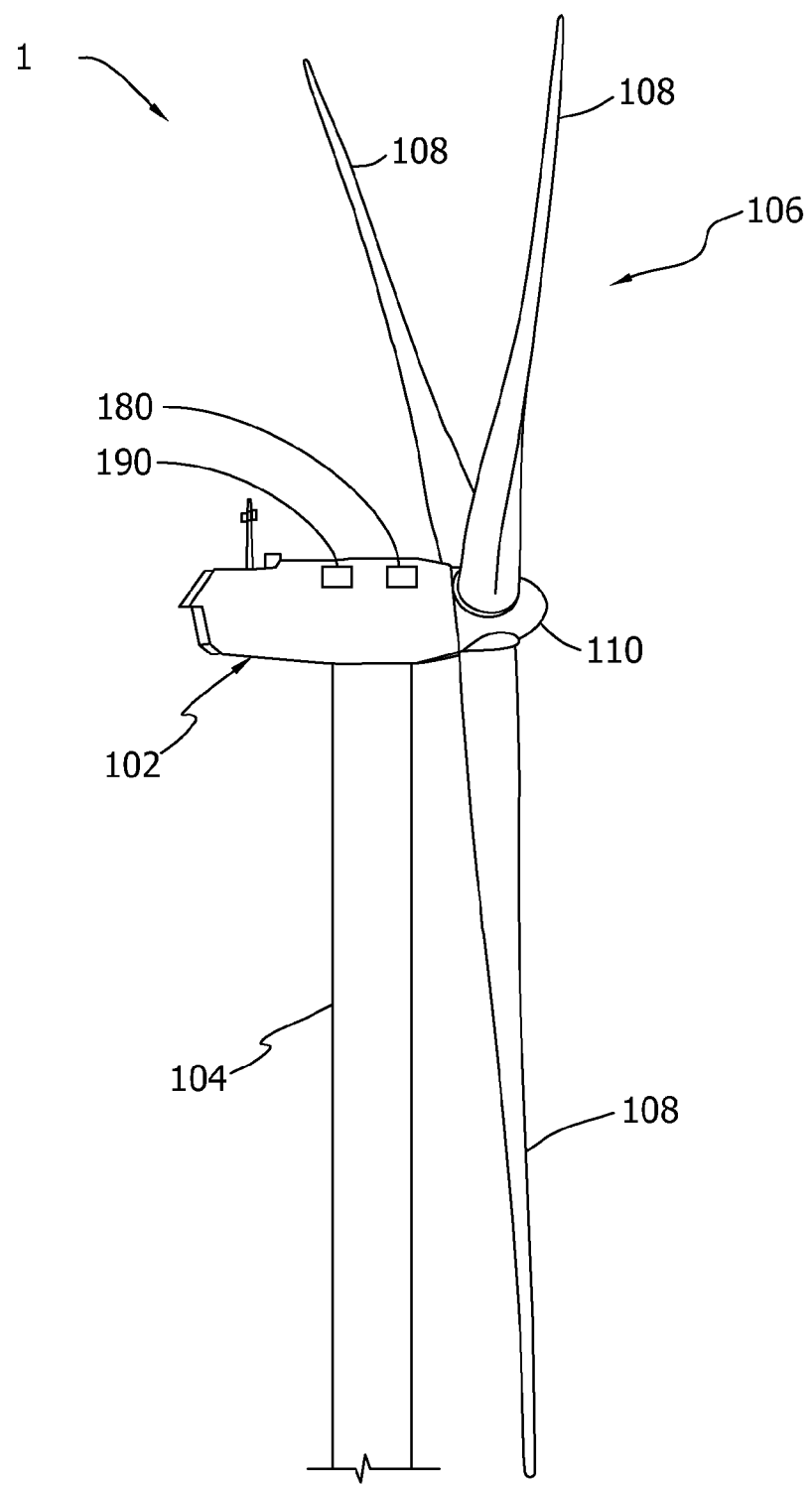
FIG. 3 is a view of a portion of an exemplary wind turbine with two redundant devices.

FIG. 3 is a perspective view of a portion of an exemplary wind turbine 1, according to embodiments described herein. Wind turbine 1 includes a first redundant device 180 and at least one other (e.g. a second) redundant device 190, which may be for example fans. Alternatively or additionally, pitch drives, temperature controlling devices, temperature adjusting devices, heaters, pumps, switches, yaw drives, brake calipers, electrical power converters, and/or fuses may be provided as redundant device's. A feature of redundant devices may be that if or when one of the redundant devices fails, at least one other redundant device may provide the function of the first, so that the wind turbine may continue operating. The at least one other redundant device may be identical, although not necessarily, to the first.

Figure 4:
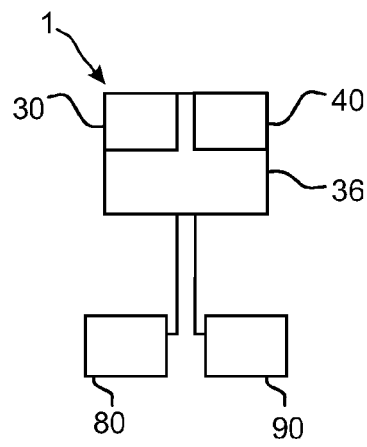
FIG. 4 is a schematic of redundant devices installed in a wind turbine, according to embodiments described herein.

FIG. 4 is a schematic of redundant devices installed in a wind turbine 1, according to embodiments described herein. At least one of the redundant devices 80, 90 are controlled by a controller 36, for example a first 80 and an at least one other redundant device 90, e.g. a second redundant device. The controller may optionally include a processor 40 and a memory 30. As used herein, the term "processor" is not limited to integrated circuits referred to in the art as a computer, but broadly refers to a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels. In an embodiment, the controller 36 is the turbine controller 202. Alternatively or additionally, the controller 36 is operatively coupled, e.g. in communication with, the turbine controller 202.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary-variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions. The controller's function is not limited solely to the operation of the redundant devices, but may simultaneously or alternately be used for processes associated with the operation of a wind turbine.

A problem with the operation of two redundant devices in a wind turbine is that when one redundant device fails, it can be the case that the other redundant devices fails soon thereafter, possibly because both have been exposed to similar conditions. When a device fails, e.g. a redundant device, a service visit may need to be scheduled to repair or replace the failed device, which may be costly. Also, the wind turbine's performance may be compromised upon failure of the device. It can also be the case that failure of more than one redundant device negatively impacts performance. An advantage of embodiments of methods of operating redundant devices disclosed herein is that the likelihood of more than one redundant device failing before a regularly scheduled maintenance is reduced, which serves to decrease the cost of operation of the wind turbine.

Figure 5:
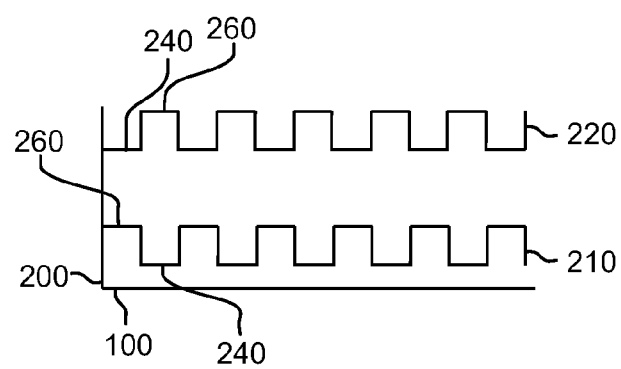
FIG. 5 is a graph of control states of redundant devices within a wind turbine, according to embodiments described herein.

FIG. 5 shows a graph of control states of redundant devices within a wind turbine, according to embodiments described herein. A time axis 100 is shown horizontally, and a state axis 200 is shown vertically. A first control 210 imposes at least two states on a first redundant device, for example the first control imposes either a resting state 240 or a lifetime reducing state 260 on the first redundant device. For example the resting state is off, and the lifetime reducing state is on. A second control 220, for example a second control which controls a second redundant device, also imposes at least two states comprising a resting state and a lifetime reducing state (e.g. off and on states, respectively).

In an embodiment according to FIG. 5, the first redundant device is on while the second redundant device is off. Since the redundant devices are identical, having the same expected operating lifetime, and are operating with a 50/50 duty cycle, if one fails, it is likely that the other will fail soon since it has been exposed to the same total time of the lifetime reducing state (e.g. the on state). In other words, the redundant devices are controlled so that both redundant devices are expected to fail at approximately the same time, because each is in the lifetime reducing state 50% of the time.

In an embodiment, when the first redundant device is expected to fail, the at least one other redundant device is expected to continue functioning.

Figure 6:
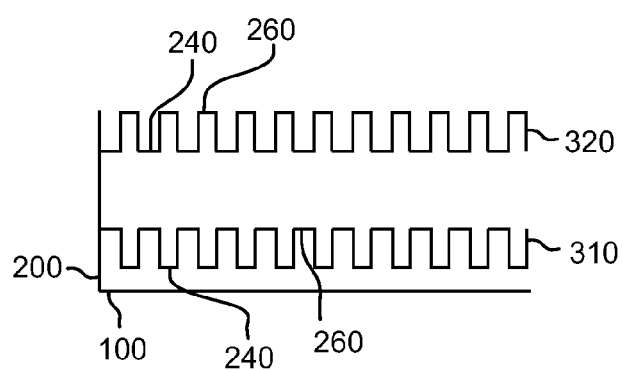
FIG. 6 is a graph of control states of redundant devices within a wind turbine, according to embodiments described herein.

In an embodiment according to FIG. 6, a 60:40 duty cycle is imposed on the first and at least one other redundant device. The first control 310 alternately imposes the lifetime reducing state 260 or the resting state 240 on the first redundant device. The second control 320, e.g. a second control assigned to a second redundant device, also alternately imposes a lifetime reducing state or resting state. The first and second controls 310, 320 impose an asymmetric duty cycle distribution, e.g. 60/40, so that the first redundant device is in the lifetime reducing state 60% of the time and the at least one other redundant device is in the lifetime reducing state 40% of the time. For example, if an expected total lifetime of a redundant device is 600 days, by imposing a 60:40 duty cycle on two redundant devices, the first redundant device is expected to fail when the second redundant device has 200 days (i.e. 600−(40/60)×600) of lifetime remaining. Not only is the second redundant device expected to continue functioning, but to continue functioning for a length of time such that the failed device can be repaired or replaced at a regularly scheduled maintenance visit. An immediate scheduling of a site visit to repair or replace the failed redundant device is not necessary due to the expectation that the at least one other redundant device has sufficient remaining lifetime to continue functioning long enough for the failed device to be repaired or replaced during the regularly scheduled maintenance visit. An advantage is that costs of an unregularly scheduled site visit are avoided. Another advantage is that the likelihood of redundant equipment failing very close in time is reduced. A further advantage is that there is decreased likelihood, that complete wind turbine stoppage occurs due to failure of all available redundant devices of a given category; to name one example, the failure of two fans of a wind turbine having two redundant fans; in another example, the failure of two switches.

For example, in a wind turbine with two redundant fans, one fan fails. The second fan, and the wind turbine, continues operating because the wind turbine can run in most operating conditions with only one functioning fan. The wind turbine continues operating, possibly at full, nearly full load, or reduced load because the ambient temperature provides good cooling, or with some power curtailment. For example, if regularly maintenance is scheduled every 6 months, due to the relatively long duration of remaining lifetime (e.g. 200 days), the failed redundant device can be replaced at the regularly scheduled maintenance visit. An advantage is the reduced cost of replacing the failed device during a regularly scheduled maintenance visit rather than during a specially scheduled maintenance visit. Other asymmetric duty cycle distributions are contemplated, for example 51:49, 55:45, 65:35, 2:1, 3:1, 4:1, 5:1, 6:1, 7:1, 8:1, and 9:1. Ranges of asymmetric duty cycle distributions are contemplated, for example such that the first redundant device is running from 51% to 99.99% of the time, or from 55 to 95% of the time, or from 60 to 90%, or from 65 to 85%, or from 70 to 80%.

In an embodiment, the resting state is an off state, or a low power state, or the like, such that in the resting state the rate of reduction of the remaining lifetime of the redundant device is lower than in a lifetime reducing state.

In an embodiment, the first control 310 controls a first redundant device, and the second control 320 controls at least one other redundant device, for example two, three, or four redundant devices.

In an embodiment, at least one of the first and second controls are binary controls, for example the first and second controls are binary controls. In another embodiment, the first and second controls are at least binary controls.

In an embodiment, the first device and at least one further device redundant to the first are operated such that, over a time of wind turbine operation, the first device is subjected to a greater lifetime reduction compared to any of the at least one further device. For example, if the a number of redundant devices is n+1 (n is the number of devices redundant to the first); over a time of wind turbine operation, the first device may be operated more than 1/(n+1) of the time of operation of the n+1 redundant devices. In other words, if there are 2 redundant devices, the first device is operated according to an asymmetric duty cycle so that it is operating more than half the time. Alternatively or additionally, the first device in the lifetime reducing state more than 50% of the time, whereas the other device, redundant to the first, is in the lifetime reducing state less than 50% of the time; so an asymmetric duty cycle may be applied so that the operation of the redundant devices is distributed unequally and such that the first device is operated more than the other(s). For example, the operation of the redundant devices is distributed from 55:45 to 90:10, or approximately 60:40.

Figure 7:
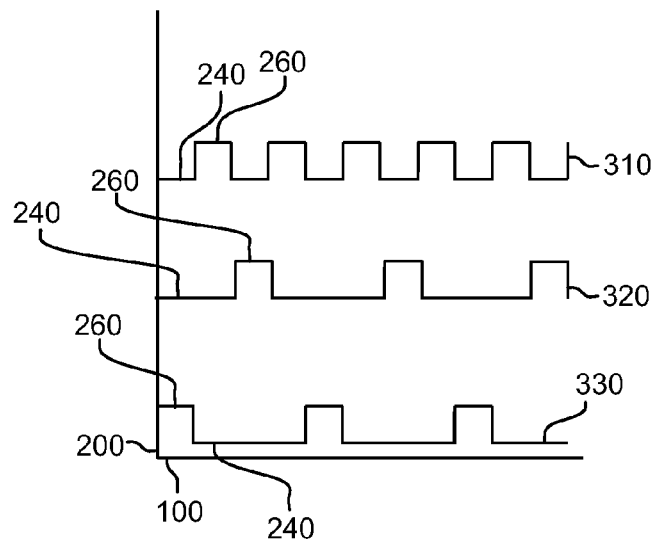
FIG. 7 is a graph of control states of redundant devices within a wind turbine, according to embodiments described herein.

FIG. 7 shows an embodiment in which the first redundant device is controlled by the first control 310, a second redundant device is controlled by a second control 320, and a third redundant device is controlled by a third control 330. When the first redundant device, according to the embodiment depicted in FIG. 5, is expected to fail, at least one other redundant device continues functioning. For example, the first control imposes a 50/50 duty cycle on the first redundant device, and the remaining 50% of the time is split equally between the second and third redundant devices. Thus when the first redundant device fails, the remaining two redundant devices are expected to each have half of their expected lifetimes remaining.

Figure 8:
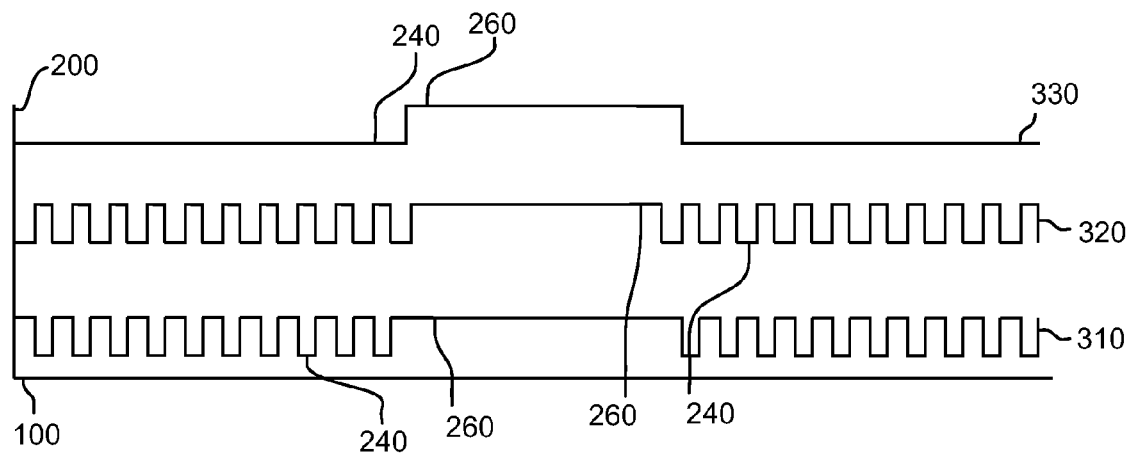
FIG. 8 is a graph of control states of redundant devices within a wind turbine, according to embodiments described herein.

FIG. 8 shows a first control 310, second control 320, and third control 330, according to an embodiment. For example, two redundant devices are operated, with a mainly 60:40 duty cycle distribution imposed by the first and second controls 310, 320. The 60:40 duty cycle distribution of the first and second controls 310, 320 are controlled by the third control 330 which imposes the lifetime reducing state 260 (e.g. both on) on both redundant devices simultaneously during part of the operation time of the wind turbine.

In FIG. 8, according to an embodiment, during some operating conditions of wind turbines, redundant devices are preferably run simultaneously in their lifetime reducing states (e.g. on). The lifetime reduced is that of the redundant components, which may reduce wear and/or stress on one or more components other than the redundant components which are less preferable to replace (e.g. the other component(s) are more expensive).

In an embodiment, an OR gate connected to the first control 310 and the third control 330 determines the state of the first redundant device; and an OR gate connected to the second control 320 and the third control 330 determines the state of the second redundant device. The OR gate may be hardware or software implemented.

Figure 9:
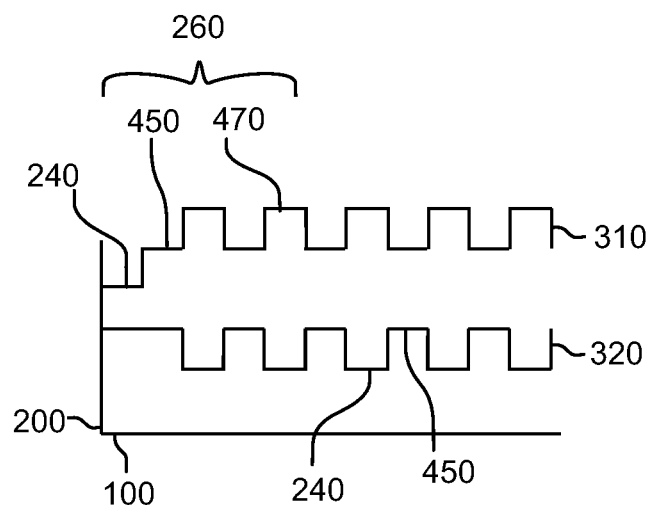
FIG. 9 is a graph of control states of redundant devices within a wind turbine, according to embodiments described herein.

FIG. 9 shows, according to an embodiment, a first control 310 which imposes a resting state 240 and a lifetime reducing state 260 of two levels, a low level 450 and a high level 470. Over time, the first control 310 imposes alternatively one of the three states and levels on the first redundant device. For example, the first redundant device is operated half the time in the high level 470 and half the time in the low level 450, and at least one other redundant device is operated half the time in the low level 450 and half the time in the resting state 240. When the first redundant device is expected to fail, the at least one other redundant device (e.g. a second redundant device) is continuing functioning.

Additionally, for example, the redundant devices have an expected lifetime of 1000 days when operated in the high level, 2000 days when operated in the low level, and the resting state does not impact the lifetime of the devices. Following the first control 310 and second control 320 as explained in the previous paragraph, the first redundant device is expected to fail when the second redundant device has 1333 days of lifetime remaining under low level operating condition. This may be convertible to half that many days of operation of the second redundant device at the high level of operation.

In an embodiment, when the first redundant device fails, the at least one other redundant device can be controlled at an increased level (e.g. under more load, which can mean providing more output, providing more effect such as cooling, more often running in a lifetime reducing state and/or in a more highly lifetime reducing state) compared to its previous level so that the operation of the wind turbine can continue at full load, nearly full load, or reduced load. For example, if a fan which provides cooling for other components fails, a redundant fan or redundant cooling device (e.g. another fan or a Peltier cooler if appropriate) can be operated under more load, e.g. at increased capacity such as maximum capacity in order to safely operate the wind turbine at nearly full load, full load, or reduced load of the wind turbine.

In an embodiment, when any of the redundant devices fail, the remaining operational devices can be operated at increased load until the regularly scheduled maintenance visit (e.g. at increased load can mean providing more output, providing more effect such as cooling, more often in a lifetime reducing state and/or in a more highly lifetime reducing state)

In an embodiment, the controller and/or control algorithm adjusts the operation of the remaining operational redundant device(s) after failure of at least one of the redundant devices (e.g. the first device), in a new appropriate manner, such as possibly differently compared to before the device failure. Furthermore if one of the redundant devices fails after failure of the first device, and/or if two or more redundant devices fail, the control and/or control algorithm appropriately adjusts the operation of the remaining redundant device(s). For example, with a total of 3 redundant devices, after failure of one (e.g. the first), the remaining two redundant devices can be operated such that the operation of the 3 devices is distributed 0:67:33 (asymmetrically) or 0:50:50 (symmetrically among the remaining redundant devices).

In an embodiment, the controller determines whether curtailment or other limitations, such as a curtailment of energy production, are appropriate after the failure of at least one of: the first device, a device redundant to the first device, and any subset of the redundant devices. For example, the safe operation of a heat generating component can be curtailed after failure of a first cooling device and/or at least one other cooling device redundant to the first cooling device. The operation of the wind turbine can adjusted (e.g. by a control, processor, and/or controller) to reduce the heat generation of the heat generating component which may curtail power output. Alternatively or additionally, the operation of the remaining operational redundant device(s) is under increased load, such as to provide more cooling from the remaining operational redundant device(s).

Figure 10:
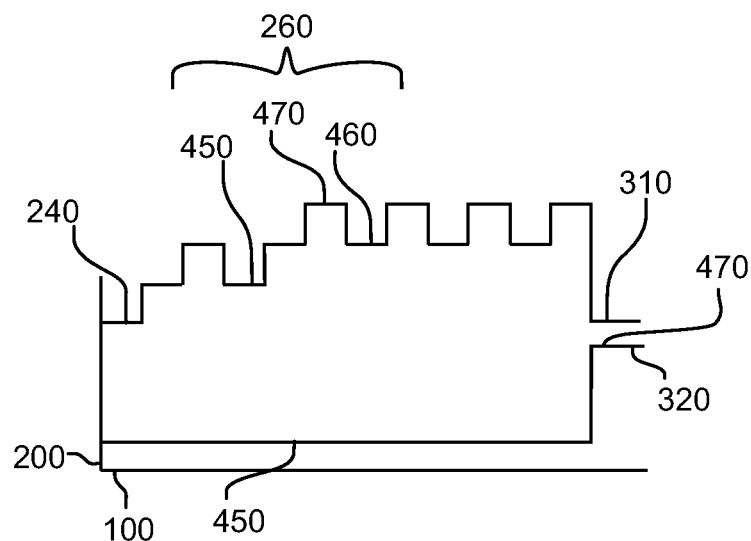
FIG. 10 is a graph of control states of redundant devices within a wind turbine, according to embodiments described herein.

FIG. 10 shows, according to an embodiment, a first control 310 which imposes a resting state 240 and a lifetime reducing state 260 of three levels: a low level 450, medium level 460, and a high level 470. For example, the first redundant device is controlled by the first control 310 which imposes a medium or high level of the lifetime reducing state (e.g. medium or high speed levels of a fan); and at least one other redundant device is controlled by the at least one other control 320 (e.g. the second control) which imposes a low level lifetime reducing state. When the first redundant device fails, the at least one other redundant device is controlled at a high level of the lifetime reducing state (e.g. a high speed level of a fan). The first redundant device can be repaired or replaced at a regularly scheduled maintenance visit; optionally the other redundant device(s) can be replaced or refurbished at the same time. An advantage of replacing or refurbishing the other redundant device(s) is that the asymmetric duty cycle can be reinstated, and the failure of the first (redundant) device can again be the predictable or most likely first failure among the redundant devices when operated according to conditions described herein.

Figure 11:
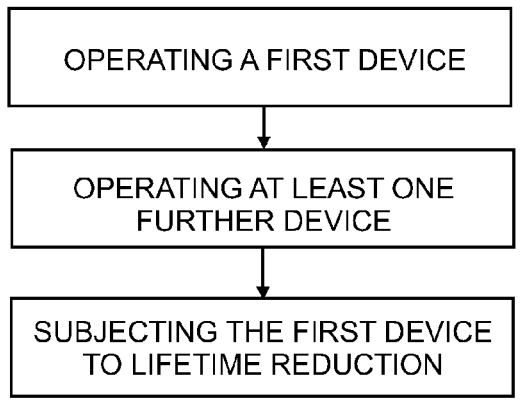
FIG. 11 is a schematic of a process of operating a wind turbine, according to embodiments described herein.
Figure 12:
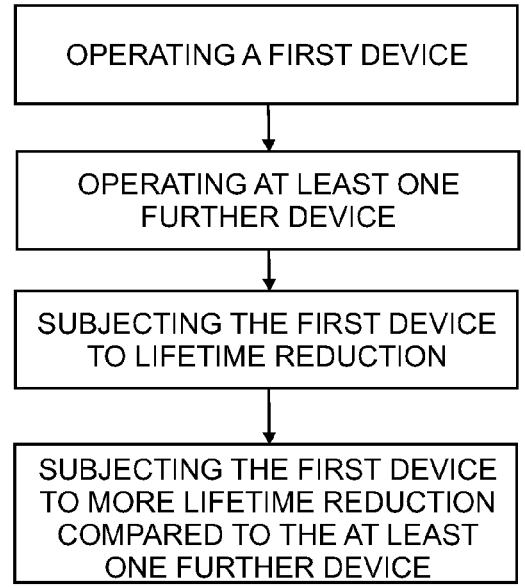
FIG. 12 is a schematic of a process of operating a wind turbine, according to embodiments described herein.

FIG. 11 shows a method of operating a wind turbine according to an embodiment, comprising operating a first device and operating at least one further device that is redundant to the first. In an embodiment, the first device is subjected to lifetime reduction (by for example control by an asymmetric duty cycle) that is greater than the lifetime reduction of the other redundant devices. For example, each of the redundant devices have an expected total lifetime and, according to an embodiment, when the first device fails, the remaining lifetime of the at least one further device is at least 30 percent of its expected total lifetime. FIG. 12 shows a method of operating a wind turbine, according to an embodiment, wherein the first device is subjected to more lifetime reduction compared to the at least one further device.

Figure 13:
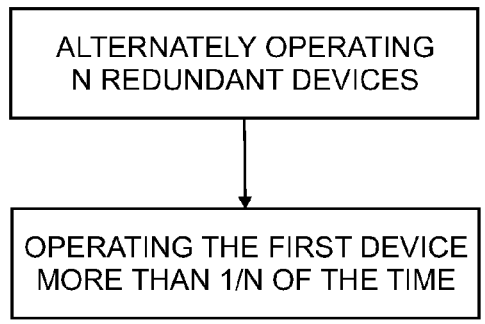
FIG. 13 is a schematic of a process of operating a wind turbine, according to embodiments described herein.

FIG. 13 shows a method of operating a wind turbine, according to an embodiment, comprising alternately operating N redundant devices, and operating the first device (of the N redundant devices) more than a fraction of 1/N of the time (e.g. with 2 redundant devices the first is operating more than half the time). Therefore, an asymmetric duty cycle is applied, and the first device is likely to fail first, and the remaining redundant device(s) to continue functioning. One of the redundant devices (e.g. the first device which is failed in this example) can then be replaced or repaired at a regularly scheduled maintenance of the wind turbine. Optionally more than one of the redundant devices can be replaced or refurbished (or any combination thereof), e.g. all of the redundant dices are replaced.

In an embodiment, three redundant devices are operated according to an asymmetric duty cycle distribution (e.g. load distribution) of 50:30:20 so that the first device is operating with approximately 50% of the load, the second device is operating with approximately 30% of the load, and the third device is operating with approximately 20% of the load. In another embodiment, the load distribution among four redundant devices is L:M:P:Q, with L>M, L>P, and L>Q; for example L=40, M=30, P=20, and Q=10.

Figure 14:
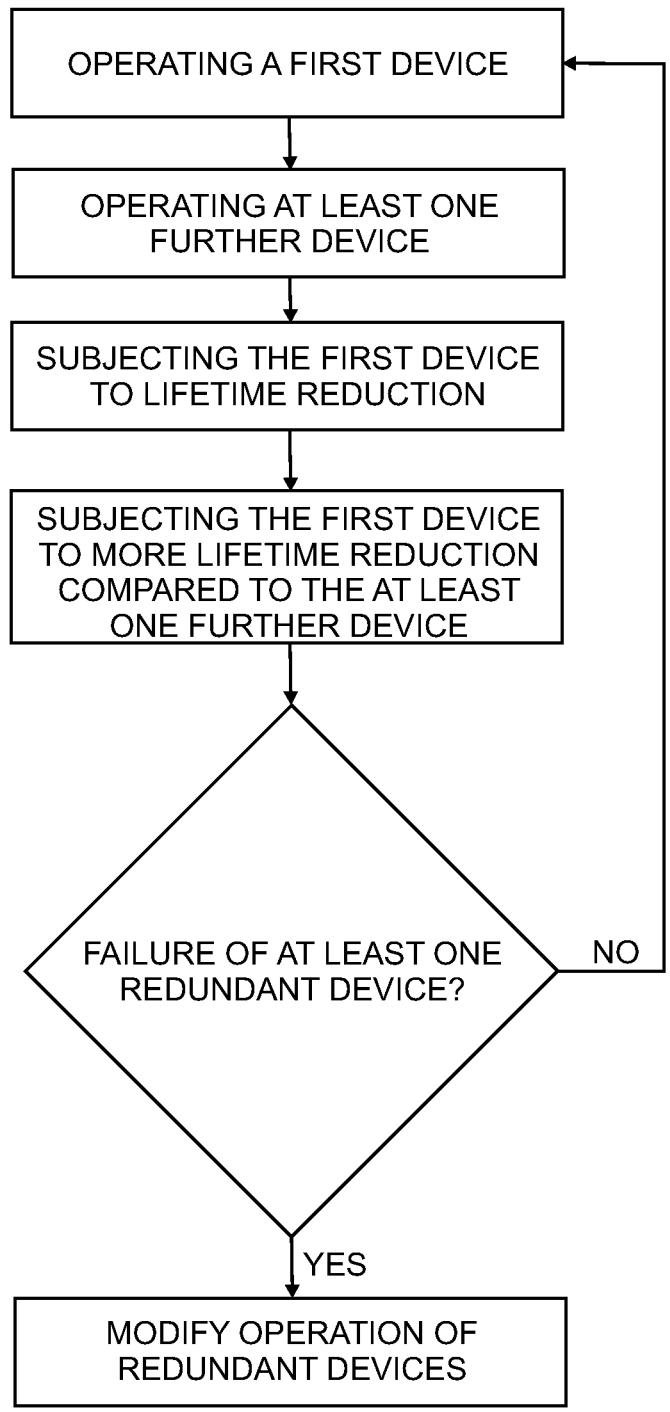
FIG. 14 is a schematic of a process of operating a wind turbine, according to embodiments described herein.

FIG. 14 shows a method of operating a wind turbine according to an embodiment, comprising operating a first device and operating at least one further device that is redundant to the first. In an embodiment, the first device is subjected to lifetime reduction (by for example control by an asymmetric duty cycle) that is greater than the lifetime reduction of the other redundant devices. Upon failure of at least one of the redundant devices, the operation of the wind turbine is modified. For example, preceding the failure, the N devices are operating such that the first device is exposed to more lifetime reduction than the other devices and it fails. Alternatively or additionally a device redundant to the first fails. The operation of the remaining operational redundant device(s) is then modified to compensate for the failure of the failed device(s), e.g. the same or approximately the same total load previous to the failure of the device is met by the operation of the remaining redundant devices. Additionally or alternatively, the remaining redundant devices are operated at increased or maximum load to their load previous to the failure, optionally with curtailment of wind turbine performance.

It is contemplated that the methods of operating a wind turbine disclosed herein, particularly of operating redundant devices in a wind turbine, can be applied to operation of other machinery, especially machinery with redundant devices. For example, other energy plants such as oil and gas, nuclear, and solar plants may contain redundant devices which can be controlled in manners consistent with the operational methods disclosed herein. Other examples, such as systems in airplanes, ships, climate controls in buildings, and/or large infrastructure installations may be amenable to operational methods disclosed herein. Furthermore, machinery, particularly big machinery and/or remote machinery for which it is advantageous for operation thereof to continue after failure of a device are particularly amenable to operational methods disclosed herein.

In an embodiment, a wind turbine comprising a tower supporting a nacelle and at least one blade for receiving energy is provided; the wind turbine further comprises a first device and at least further device redundant to the first device. In an embodiment, the first device is operated such that the first device is expected to fail before each of the at least one further device. The wind turbine may further comprise a controller which controls the redundant devices (e.g. the first device etc.). For example, over a time of wind turbine operation, the first device is subjected to a greater lifetime reduction compared to any of the at least one further devices. For example, the first device (and the redundant devices) are a fan, a rotating device, a moving part, a device comprising at least one moving part, a circuit, a part of a circuit, an electrically conducting part, a high voltage circuit, a safety related device, a fuse, a circuit breaker, a pitch drive, a temperature controlling device, a temperature adjusting device, a heater, a pump, or a switch. Risks of damage to the first device (and the redundant devices) may be by normal usage, and/or may be exacerbated by other conditions. For example, failure or the risk of failure may be induced or increased by: mechanical stress, for example due to the action of waves on an off-shore wind turbine; by thermal stress, for example by changes of temperature for example seasonal changes to temperature; by corrosion, for example by exposure of electrical components to salty aerosols, water, and/or salt water; by exposure or operation at high voltages, for example in the activation of a circuit breaker or fuse.

An advantage of the method of operating redundant devices in a wind turbine described herein is that a failed redundant device can be replaced at a regularly scheduled maintenance visit, which is at reduced cost in comparison to a specially or unregularly scheduled maintenance visit. This is particularly advantageous for off-shore wind turbines.

The above-described systems and methods facilitate the control of a wind turbine, so that replacement or repair of redundant devices can be done at regularly scheduled maintenance visits. This can lead to cost savings, because special maintenance or emergency maintenance are less likely to be required.

Exemplary embodiments of systems and methods for control of redundant devices in a wind turbine are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating redundant devices in a wind turbine, comprising:
    operating a first device and at least one further device redundant to the first device; and
    subjecting the first device, over a time of wind turbine operation, to a greater lifetime reduction compared to any of the at least one further devices,
    wherein a number of redundant devices is n+1, n being the number of the at least one further device redundant to the first device, and
    wherein over the time of wind turbine operation, the first device is operating more than 1/(n+1) of the time of operation of the n+1 redundant devices.

2. The method of operating redundant devices in a wind turbine of claim 1, wherein the number of redundant devices is 2; and wherein the first device and the one further device are operating according to an asymmetric duty cycle such that the operation of the redundant devices is distributed from 55:45 to 90:10.

3. The method of operating redundant devices in a wind turbine of claim 2, wherein the operation of the redundant devices is distributed approximately 60:40.

4. The method of operating redundant devices in a wind turbine of claim 1, wherein each of the redundant devices has an expected total lifetime; and wherein the remaining lifetime of the at least one further device is at least 30 percent of the expected total lifetime of the redundant device when the first device fails.

5. The method of operating redundant devices in a wind turbine of claim 1, further comprising:
    replacing at least one of the redundant devices at a time coinciding with a regularly scheduled maintenance of the wind turbine, or
    repairing at least one of the redundant devices at a time coinciding with a regularly scheduled maintenance of the wind turbine.

6. The method of operating redundant devices in a wind turbine of claim 5, wherein the repaired or replaced redundant device is the first device.

7. The method of operating redundant devices in a wind turbine of claim 1, wherein operating the first device and the at least one further device comprises alternately imposing at least two states on the first redundant device; and wherein the at least two states comprise at least one lifetime reducing state.

8. The method of operating redundant devices in a wind turbine of claim 1, further comprising:
    increasing the load of the remaining redundant devices after failure of at least one of the first device and the at least one further device redundant to the first device.

9. A method of operating redundant devices in a wind turbine, comprising:
    operating a first device and at least one further device redundant to the first device such that the first device is expected to fail before any of the at least one further device, and
    alternately imposing at least two states on the first device, wherein the at least two states comprise at least one lifetime reducing state.

10. The method of claim 9, further comprising alternately imposing at least two states on the at least one further device; wherein the at least two states comprise at least one lifetime reducing state.

11. The method of claim 10, wherein over a time of wind turbine operation, the first device is in the lifetime reducing state more than any of the at least one further device.

12. The method of claim 11, further comprising:
    replacing at least one of the first device and the at least one further device at a time coinciding with a regularly scheduled maintenance, or
    repairing at least one of the first device and the at least one further device at a time coinciding with a regularly scheduled maintenance.

13. The method of claim 11, wherein the number of redundant devices is n; and wherein alternately imposing at least two states on the first device and alternately imposing at least two states on the at least one further device are such that the first device is operating more than 1/n of the time of operation of the n redundant devices.

14. The method of claim 13, wherein the number of redundant devices is 2; and wherein the first device and the one further device are operating according to an asymmetric duty cycle such that the operation of the redundant devices is distributed from 55:45 to 90:10.

15. The method of claim 14, wherein the operation of the redundant devices is distributed approximately 60:40.

* * * * *